United States Patent [19]

Horrigan

[11] 4,426,957

[45] Jan. 24, 1984

[54] SAFETY RELEASE PET COLLAR

[76] Inventor: Richard Horrigan, Stormfield, Rte. 107, West Redding, Conn. 06896

[21] Appl. No.: 388,802

[22] Filed: Jun. 16, 1982

[51] Int. Cl.³ .............................................. A01K 27/00
[52] U.S. Cl. ..................................... 119/106; 119/110
[58] Field of Search .......................... 119/106, 96, 110; 403/2, DIG. 4

[56] References Cited

U.S. PATENT DOCUMENTS

| | | | |
|---|---|---|---|
| 2,743,702 | 5/1956 | Sullivan | 119/106 |
| 3,605,384 | 9/1971 | Pacini | 119/96 |
| 3,995,598 | 12/1976 | Gardner et al. | 119/110 |
| 4,321,891 | 3/1982 | Moeller | 119/106 |

FOREIGN PATENT DOCUMENTS 14217 9/1934 Australia .............................. 119/106

Primary Examiner—Jay N. Eskovitz
Attorney, Agent, or Firm—H. Gibner Lehmann; K. Gibner Lehmann

[57] ABSTRACT

A safety-release pet collar to prevent animals from possibly choking in the event that the collar inadvertently becomes caught on a branch, twig, stump, fence post or the like. The collar comprises a two-piece band intended to encircle a pet's neck in the usual manner and to be fastened by a conventional buckle arrangement. The band has a second pair of separable ends which are held together by a releasable connector, such as cooperable loop and hook strips. The second pair of ends have loops through which a leash or clasp can be passed, to lock the ends together and prevent separation of the connector strips. When the pet is on the leash, strain on the connector strips is relieved and the pet cannot normally pull the connection loose. However, when the leash or clasp is removed and the collar remains in place, the Velcro connector strips can separate under force if it inadvertently becomes caught on or entangled in branches, etc.

9 Claims, 3 Drawing Figures

4,426,957

SAFETY RELEASE PET COLLAR

BACKGROUND

This invention relates generally to pet collars, and more particularly to collars of the type that incorporate some form of force-release mechanism which enbles the animal to free itself in the event that the collar becomes entangled in tree branches, stumps, fence posts, or the like.

In the past, the widespread use of conventional pet collars has presented serious hazards to the animals, particularly in rural or wooded areas where they were often allowed to roam for extended lengths of time, usually unattended. There have occurred a number of accidental stranglings caused by such collars becoming caught on a tree branch or other object. Collars of the type known as "choke collars" presented even greater risks to the animal, since such devices would tend to tighten if the animal became caught and attempted to free itself.

In an effort to reduce the likelihood of injury or death to the animal, some owners have taken to removing the collar completely prior to releasing the animal or allowing him to roam. This practice has several disadvantages. Under such circumstances, the license that is supposed to accompany the pet is removed with the collar, and in the event that the animal is picked up or becomes lost, there is no way of determining who the owner is. Also, in many areas, it is against the law to allow a pet to roam unattended, or without a license or tag.

An alternative to removing the collar is to provide some sort of safety coupling which can release upon the collar experiencing a tensile force in excess of a predetermined amount, as when the pet becomes caught.

A number of prior patents show force-release collars of one type or another. For example, U.S. Pat. No. 3,994,265 illustrates a collar for cats, wherein there is provided a ball-and-socket relese-type fastener for the collar, the socket part being resilient and capable of being sprung so as to release the ball in the event that excessive force is applied to the fastener. This particular arrangement included a turn-buckle which inactivated the release function, such that the owner could maintain positive control of the animal if it was desired to use the collar with a leash.

Another construction is disclosed in U.S. Pat. No. 3,589,341, which shows a cat collar incorporating a two-part buckle having concealed permanent magnets in each part, such that when the buckle parts are assembled together there is provided a smooth exposed surface that resists the tendency for the buckle to become caught on tree branches or other objects. The magnets can separate to release the buckle if excessive force is applied to the collar.

Yet another collar is disclosed in U.S. Pat. No. 2,612,139. This construction is somewhat similar to the first-mentioned patented device discussed briefly above, in that a simple ball and socket fastener is provided. The socket is constituted as a split bushing presenting three spring fingers which yieldably retain the ball, and which can be sprung radially outwardly to release it in the event that excessive force is applied to the collar.

U.S. Pat. No. 4,091,766 shows a rather complex multi-layer collar incorporating a pocket for storing an identifying tag or license, a layer of reflective material applied to the collar, and a releasable fastener of the Velcro type. The hazards of conventional collars are discussed in this patent, and the releasable feature of the collar that is described has been found to sufficiently reduce the hazards, according to the inventor.

Modifications of a conventional choke collar that is widely used with pets are shown in U.S. Pat. Nos. 3,011,478 and 2,614,533. The latter patent involves a multi-chain arrangement which operates to apply pressure to the underside of the dog's neck which, the inventor has indicated, is the most sensitive area for applying a control pressure to the animal.

The second patent, U.S. Pat. No. 3,011,478, shows a modified choke collar incorporating a buckle constituted as a ring, and a cooperable spiral spring detent which can pass through the ring if the detent is sprung and which will enable the animal to free itself in the event that it becomes caught on a branch or post. In addition, the collar can be adapted for use as a conventional choke collar, if desired, such modification, however, defeating the safety features of the device.

While the above arrangements operated in a generally satisfactory manner, it became apparent that a number of distinct drawbacks to the various constructions discussed above existed. Such drawbacks may have contributed to the lack of wide acceptance of the devices that have been developed up to the present date.

Many of the safety collars shown in the above patents were subject to inadvertent release at inappropriate occasions, that is, at times during which the animal was under the control of the owner. For instance, in the event that the pet gave a sudden "tug" at the leash, there was a good possibility that the collar would release, thus freeing the animal and exposing it to possible danger from passing vehicles or from other pets in the area. This was true of the collars of U.S. Pat. Nos. 3,011,478 and 4,091,766. Also, the inconvenience to the owner, as well as his personal liability, had to be considered, if the animal inadvertently broke loose at an inopportune time.

With the device of U.S. Pat. No. 3,994,265, there existed the possibility that the pet might be released by the owner, with the collar turnbuckle in the "secure" position, thus completely defeating the safety feature of the device.

In the arrangement shown in U.S. Pat. No. 2,614,533, no safety feature was provided. In the event that the pet inadvertently escaped with the leash still in place, the leash could, again, become caught and possibly cause strangulation.

Thus, to my knowledge there existed no real solution to the problem of providing a reasonably foolproof safety collar which could readily release itself in the event the animal experienced difficulty, yet which would provide adequate retention of the pet when it was held by a leash and under the control of the owner.

SUMMARY

The above drawbacks and disadvantages of prior force-release safety collars for pets are obviated by the present invention, which has for one object the provision of a novel and improved safety-release pet collar which is extremely simple in construction, while at the same time providing excellent safety against possible harm or injury to the pet, resulting from choking or strangulation.

A related object of the invention is to provide an improved safety collar as above set forth, wherein the individual parts making up the device are readily fabricated from easily obtainable materials, and involve no special fabricated pieces that might require complex tools or assembly procedures, thus making the product economical from the manufacturing standpoint.

Still another object of the invention is to provide an improved safety collar as above characterized, which features an improved control of the pet by the owner when the animal is being held by a leash, such that the possibility of the animal inadvertently pulling loose from the collar and escaping is greatly minimized, all without any sacrifice of the safety features of the device.

Yet another object of the invention is to provide an improved collar of the kind indicated, which is both comfortable and non-irritating to the animal, and easy to apply and use by the owner.

A still further object of the invention is to provide an improved collar as outlined above, which is both aesthetically pleasing, and functionally effective, all at a cost which is quite nominal as compared with conventional collars such as those which are currently on the market.

A still further object of the invention is to provide an improved safety collar as described above, which lends itself to use wiht different types of leashes, and leash clasp arrangements, virtually without any modification of the collar being required.

The above objects are accomplished by the provision of a safety release collar for pets, comprising a two-piece band adapted to encircle the pet's neck in the usual manner, one pair of adjoining ends of the band having cooperable conventional buckle means to enable the normal applying and removing of the band from the pet's neck to be effected, and wherein the remaining pair of adjoining ends of the band have cooperable, force-release connectors adapted to become free from each other in response to experiencing excessive forces such as would occur if the band becomes caught on a branch or other object, and the pet struggles to free itself. Because the release portion of the collar is separate from the buckle, there is no interference between this release portion and the buckle as the collar is being installed, or while the collar is being worn. That is, the buckle area is available for securing an identification tag or license, as desired, with no effect on the release function.

In addition, the release function can be completely automatically inactivated by merely installing the leash onto the collar in a prescribed manner, such that the animal cannot inadvertently pull loose while under the control of the owner. The safety feature of the collar can be automatically re-activated by merely disconnecting the leash, or in the case of a double-back leash, merely by letting go of the one end of the same. Accordingly, the safety features of the collar are not sacrificed in the event that the animal runs off with the double-back leash still looped through the collar.

The materials of which the collar are constructed are readily available, and no special fixtures or tools are required during the manufacturing process. Also, the present device is easily applied to the animal in a conventional manner, and is no more uncomfortable to the pet than a conventional collar would be.

By virtue of the unique construction, the possibility of the animal becoming inadvertently choked or strangled while roaming in the woods, is virtually eliminated.

Also, the tension at which the collar is intended to release can be easily adjusted by the user, with only the aid of a scissors, by snipping off a portion of the length of one of two Velcro strips that make up part of the force-release connectors.

Accordingly, the collar is readily adaptable to different sizes and strengths of dogs and cats. Such an arrangement enhances even further the safety aspect of the present device, since the release force point can be made as high or low as desired, depending on the characteristics of the pet with which the device is being used.

Other features and advantages will hereinafter appear.

In the drawings, illustrating several embodiments of the invention:

Figure 1:
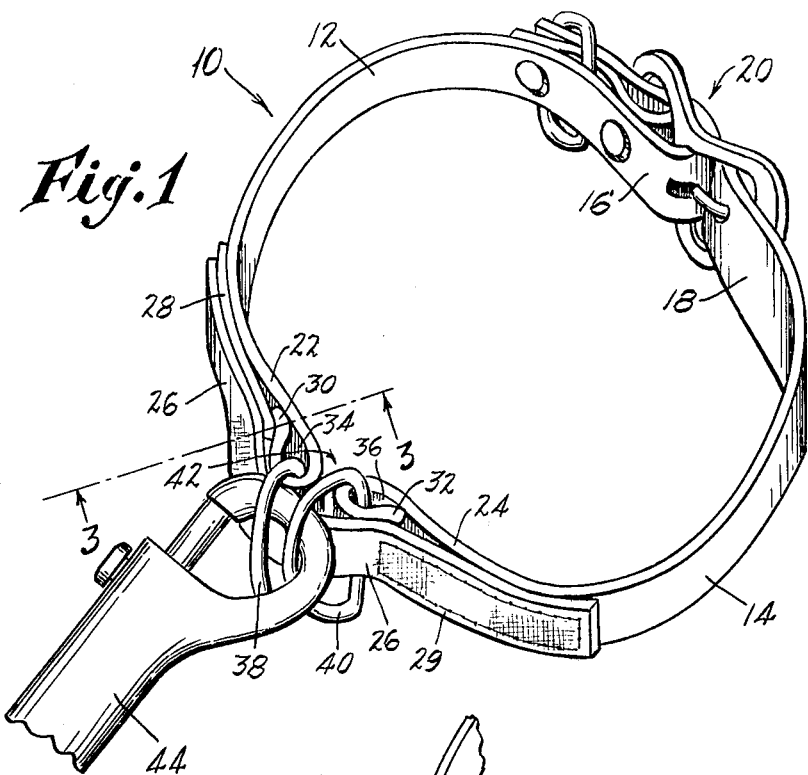
FIG. 1 is a perspective view of the safety-release collar of the present invention.

Referring first to FIG. 1, there is illustrated the present, preferred form of the invention, comprising a safety-release pet collar designated generally by the numeral 10, having essentially a two-part band including flat straps 12, 14 characterized by one pair of adjoining ends 16, 18 that are intended to be fastened together by a buckle structure 20 which may be of generally conventional construction.

In accordance with the present invention, the two-part band has a second or additional pair of adjoining ends 22, 24 which are secured together by a force-release safety connector enabling virtually instantaneous separation of the ends 22, 24 in the event that the straps 12, 14 of the band are subjected to force in excess of a predetermined amount, such as would occur if the animal's collar were to become caught on a tree branch, stump, fence post, fencing, or other object. In effecting such safety connector, I provide two hook and loop fabric strips, one having well-known multiple yieldable hooks and being designated by the numeral 26 and the other having loops and being designated 28. Such strips are commercially available, being known by the name "Velcro", which is a registered trademark and refers to materials manufactured by American Robbins Company.

The strip 28 is stitched or otherwise fastened to the end 22, with the strip 26 being similarly secured to the end 24 by a row of stitches 29. The ends 22 and 24 have folded back terminal portions 30 and 32 which are secured to the remaining portions of the ends 22 and 24 by the same stitching that holds each of the strips in place. Other fastening means such as rivets could readily be employed, with equally good results, as can be understood.

By the present invention, the ends 22 and 24 form folds or terminal-like openings 34, 36 which carry rings 38, 40 respectively, these being of generally D-shaped configuration, with the flat parts of the D lying inside the openings 34 and 36.

As shown in FIG. 1, where the ends 22 and 24 meet, there exists a gap 42, and it can be seen that the strip 26 completely bridges this gap when the collar is assembled.

Figure 3:
FIG. 3 is a section taken on the line 3—3 of FIG. 1.

FIG. 3 shows a section of the collar through the area of the terminal portion 30.

The rings 38 and 40 are adapted to be held together by a suitable leash clasp 44 as shown in FIG. 1. Under such circumstances, the clasp 44 and rings 38, 40 take substantially all of the strain off of the strips 26, 28 such that there is little or no chance of the strips being forcibly separated when the animal is on the leash. That is, when the collar is put on the pet, the strips 26, 28 are in engagement with one another, and will resist any tendency for separation of the ends 22, 24 to occur during normal wear of the collar by the pet, as will be explained further below.

During normal circumstances, the ends 22, 24 of the collar will remain juxtaposed by virtue of the retentive action of the strips 26, 28. If it is desired to remove the collar for any reason, such as during washing of the pet, or for other reasons, the buckle 20 can be readily loosened and the collar removed, as in a conventional construction.

When the pet is let outside and allowed to roam, in the event that his collar becomes caught on a branch, stum or other object, the force that will be applied to the strips 26, 28 will cause a separation, thus freeing the ends 22, 24 of the strips and enabling the pet to escape. The force at which separation of the strips will occur can be varied to suit the size or strength of the animal. For instance, with small or relatively weak dogs, the owner can cut off a length of the free end of the strip 26 with a scissors. This will reduce the number of hooks and loops of material that are in engagement, and thus reduce the force that is necessary in order to effect separation of the ends 22, 24.

With larger pets, little or no trimming of the strip 26 is required, since it is desired that the collar will not release unless the pet is hooked by a branch or other object, and struggling to free itself.

When it is intended that the pet be under the control of the owner, the clasp 44 can be installed as shown in FIG. 1. By virtue of the arrangement of the clasp 44 and rings 38, 40, virtually all strain is taken off of the strips 26, 28, and there is no tendency for these to separate. In addition, the animal will be securely held against inadvertent release.

Thus, when the owner attaches the clasp 44, the release capability of the loop and hook strips is inhibited. By the same token, when the leash clasp 44 is removed, the collar automatically reverts to a safety-type, since excessive pulling on the collar will result in virtually instant separation of the strips 26, 28, and the animal will be able to free himself in the event that his collar becomes caught.

The present construction also is convenient to use if it is desired to merely restrain the dog with the hand. One finger can be slipped through the rings 38, 40, and the dog led away or held, as desired. Alternately, the collar can be grasped by one hand that is placed over the strips. This will prevent inadvertent release of the strips, if the collar is grasped sufficiently firmly. By holding the collar in either manner, its integrity is not disturbed. With such a construction, it is usually necessary to fasten the strips only once, that is, when the collar is initially placed upon the dog's neck. Thereafter, little or no adjustment or release of the strips will be required, unless the animal becomes caught and begins to choke or suffer strangulation.

Figure 2:
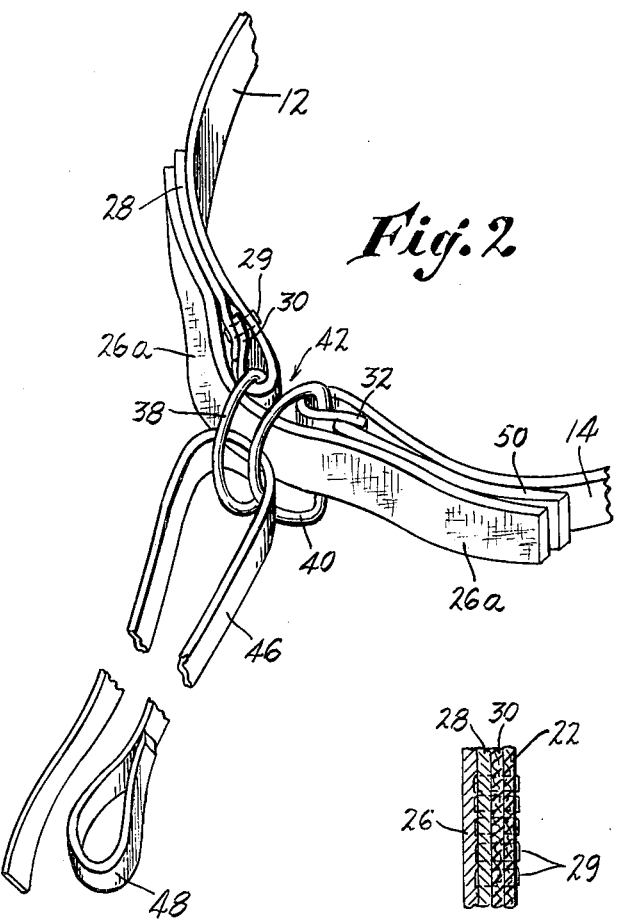
FIG. 2 is a perspective view of a somewhat modified safety-release collar.

Another embodiment of the invention is shown in FIG. 2, wherein like reference numerals indicate parts similar to those of FIG. 1.

In place of the clasp 44 shown in FIG. 1, there can be substituted a special safety leash, indicated at 46. In use, the leash is passed through the rings 38 and 40, with the two free ends of the leash being held in the hand. As shown, one end of the leash may have a loop 48, with the other end being essentially free. In the event that the leash is dropped and the pet escapes, the animal's movements will cause the leash to drag, and eventually pull through the rings 38, 40, thus greatly minimizing the possibility of injury due to the leash becoming caught. Also, in FIG. 2, an additional strip 50 is provided, being sewed to the strap 14 in place of the sewing of the strip 26, and the latter is then cooperable with the sewed-on strip 50, providing a second, separable safety connection. In other respects, the embodiment of FIG. 2 is similar to that of FIG. 1, and accordingly the operation and detailed structure thereof need not be discussed further.

The materials out of which the collar can be made are readily available. Leather or fabric types, such as nylon, have been found to work well. The structure of the collar adjacent the buckle 20 can be conventional, and thus no new assemblages are involved beyond what is normally required for the manufacture of conventional collars.

The strips can be secured by a simple stitching operation, at the same time that the ends 30, 32 are folded back. As an alternative to stitching, suitable rivets could be employed. In either case, to accept stitching or rivets, the collar material should be penetrable.

The collar has been found to function extremely well and in its intended manner, by actual tests run on a number of working models. The device is exceptionally safe, and easy to use from the standpoint of the consumer. The cost is low, making the product especially attractive. In addition to functioning well, the collar is aesthetically pleasing, and does not constitute any more of a discomfort to the animal than the wearing of a conventional collar would be.

The device is thus seen to represent a distinct advance and improvment in this field.

Variations and modifications are possible without departing from the spirit of the invention.

What is claimed is:

1. A safety-release pet collar comprising, in combination:
   (a) a two-piece band in the form of a flat strip of foldable and penetrable material, said band being adapted to encircle the pet's neck,
   (b) one pair of adjoining ends of the bands having cooperable buckle means to enable the normal applying and removing of the band from the pet to be effected,
   (c) the remaining pair of adjoining ends of the band having folded-back portions respectively forming closed loops,
   (d) said remaining pair of adjoining ends of the bands further having cooperable, force-release connectors constituted of strips of cooperable, attachable and releasable, loop-and-hook material, said connectors being adapted to become free from each other in response to experiencing excessive forces such as would occur if the band should become caught on a branch of other object and the pet struggles to be freed,
   (e) said folded-back portions of the band and said loop-and-hook strips being secured together by fastening means passing through them, and
   (f) a pair of juxtaposed rings extended respectively through said closed loops, for receiving a leash means adapted to confine said rings against separation and thereby prevent separation of the remaining pair of adjoining ends of the band.

2. The invention as defined in claim 1, wherein:
(a) said fastening means comprises rows of stitching.

3. The invention as defined in claim 1, wherein:
(a) said rings have the configuration substantially of the capital letter D.

4. The invention as defined in claim 1, wherein:
(a) the force-release connectors are disposed substantially diametrically opposite the location of the said buckle means.

5. A safety-release pet collar comprising a two-piece band adapted to encircle the pet's neck, one pair of adjoining ends of the band having cooperable buckle means to enable the normal applying and removing of the band from the pet to be effected, the remaining pair of adjoining ends of the band having cooperable, force-release connectors adapted to become free from each other in response to experiencing excessive forces such as would occur if the band should become caught on a branch or other object and the pet struggles to be freed, said force-release connectors comprising strips of loop-and-hook material, one of said strips of loop-and-hook material being secured to one of the said remaining ends of the band, the other of said strips being secured to the other of the said remaining ends of the band, means providing a pair of openings at the said remaining ends of said band, adapted to receive a restraint such as the fingers of the hand, or a leash clasp or the like, the said remaining ends forming a gap when they are juxtaposed, one of said strips of loop-and-hook material substantially completely bridging said gap when it is secured to the other of said strips.

6. The invention as defined in claim 5, and further including:
(a) a fastener passing through the said openings so as to hold the said remaining ends of the band in juxtaposed relation,
(b) said fastener, when installed, maintaining the said ends juxtaposed and opposing any force that is applied in a direction tending to separate them, said loop and hook strips being thereby prevented from separating while the pet is still under the control of the fastener.

7. The invention as defined in claim 6, wherein:
(a) said fastener comprises a leash.

8. The invention as defined in claim 6, wherein:
(a) said fastener comprises a leash clasp.

9. A safety-release pet collar comprising a two-piece band adapted to encircle the pet's neck, one pair of adjoining ends of the band having cooperable buckle means to enable the normal applying and removing of the band from the pet to be effected, the remaining pair of adjoining ends of the band having cooperable, force-release connectors adapted to become free from each other in response to experiencing excessive forces such as would occur if the band should become caught on a branch or other object and the pet struggles to be freed, said band comprising to straps, each of said straps having folded-back terminal portions to form loops, and means fastening said folded-back terminal portions to the remaining adjacent areas of the straps, said fastening means comprising rows of stitching, the force-release connectors comprising strips of cooperable loop-and-hook material, said rows of stitching extending through and securing said strips of loop-and-hook material to the respective straps.

* * * * *